United States Patent
Ferdowsi et al.

(10) Patent No.: US 11,502,765 B2
(45) Date of Patent: Nov. 15, 2022

(54) ROBUST CLOCK SYNCHRONIZATION OVER COMPUTER NETWORK

(71) Applicant: Zoox, Inc., Foster City, CA (US)

(72) Inventors: Mehran Ferdowsi, San Mateo, CA (US); Turhan Karadeniz, Oakland, CA (US); Minh Nguyen, Foster City, CA (US); Subasingha Shaminda Subasingha, San Ramon, CA (US); Harrison Thomas Waschura, Los Altos Hills, CA (US)

(73) Assignee: Zoox, Inc., Foster City, CA (US)

( * ) Notice: Subject to any disclaimer, the term of this patent is extended or adjusted under 35 U.S.C. 154(b) by 85 days.

(21) Appl. No.: 17/248,755

(22) Filed: Feb. 5, 2021

(65) Prior Publication Data

US 2022/0255653 A1 Aug. 11, 2022

(51) Int. Cl.
*H04J 3/06* (2006.01)
*H04L 43/106* (2022.01)
*H04L 43/12* (2022.01)
*H04J 3/02* (2006.01)

(52) U.S. Cl.
CPC ............. *H04J 3/065* (2013.01); *H04J 3/025* (2013.01); *H04J 3/0697* (2013.01); *H04L 43/106* (2013.01); *H04L 43/12* (2013.01)

(58) Field of Classification Search
CPC .......... H04J 3/065; H04J 3/025; H04J 3/0697; H04L 43/106; H04L 43/12; G06F 1/14
See application file for complete search history.

(56) References Cited

U.S. PATENT DOCUMENTS

| | | | | |
|---|---|---|---|---|
| 7,924,807 B2* | 4/2011 | Bauchot | ................ | H04J 3/0676 370/503 |
| 8,005,369 B2* | 8/2011 | Ko | ........................ | H04B 7/2693 398/154 |
| 8,473,003 B2* | 6/2013 | Jung | ........................ | H04W 4/14 455/553.1 |
| 9,723,582 B1* | 8/2017 | Tran | ...................... | H04W 48/12 |

OTHER PUBLICATIONS

Giorgi, "An Event Based Kalman Filter for Clock Synchronization", IEEE Transactions on Instrumentation and Measurement, Feb. 2015, 9 pgs.

Xie Tai Jun et al. "The realization of high-precise clock synchronization protocol based on adaptive exponential smoothing algorithm", 2014 2nd Intl Conf on Systems and Informatics, Nov. 2014, 5 pgs.

(Continued)

*Primary Examiner* — Chandrahas B Patel
(74) *Attorney, Agent, or Firm* — Lee & Hayes, P.C.

(57) ABSTRACT

Techniques for facilitating a robust clock synchronization across a computer network that presumes network jitter exists are discussed herein. A first device and a second device transceive a plurality of sets of time-synchronization messages to synchronize a synchronization clock of the second device to a first clock of the first device. The second device calculates a smoothing of time delay data of a plurality of sets. The time delay data is associated with a transmission duration of time-synchronization messages of the sets of the plurality. The second device sets a synchronization clock based on a time at the first device and the smoothed time delay data.

19 Claims, 6 Drawing Sheets

(56) References Cited

OTHER PUBLICATIONS

Lao et al.Implementation and Analysis of IEEE 1588 PTP Daemon Based on Embedded System, Proceedings of the 39th Chinese Control Conference, Shenyang, China, Jul. 2020, 6 pgs.
Bassam Moussa et al. "An Extension to the Precision Time Protocol (PTP) to Enable the Detection of Cyber Attacks", IEEE Transactions on Industrial Informatics, vol. 16, No. 1, Jan. 2020, 10 pgs.
International Search Report and Written Opinion for PCT Application No. PCT/US22/13248, dated Apr. 21, 2022.

* cited by examiner

ROBUST CLOCK SYNCHRONIZATION OVER COMPUTER NETWORK

BACKGROUND

The Precision Time Protocol (PTP) is a protocol utilized for synchronizing clocks throughout a computer network. On a local area network, PTP is used for measurement and control systems because it achieves clock synchronization accuracy in the sub-microsecond range. PTP is currently employed to synchronize financial transactions, mobile phone tower transmissions, sub-sea acoustic arrays, and networks that require precise timing.

Standard PTP was originally defined by the Institute of Electrical and Electronics Engineers (IEEE) 1588 standard, which describes a hierarchical primary-secondary architecture for clock distribution within a communications network. Under this architecture, a time synchronization system includes one or more communication networks and one or more network devices with clocks. The standard PTP defines a protocol for the network devices to exchanges messages across the network so as to synchronize their clocks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
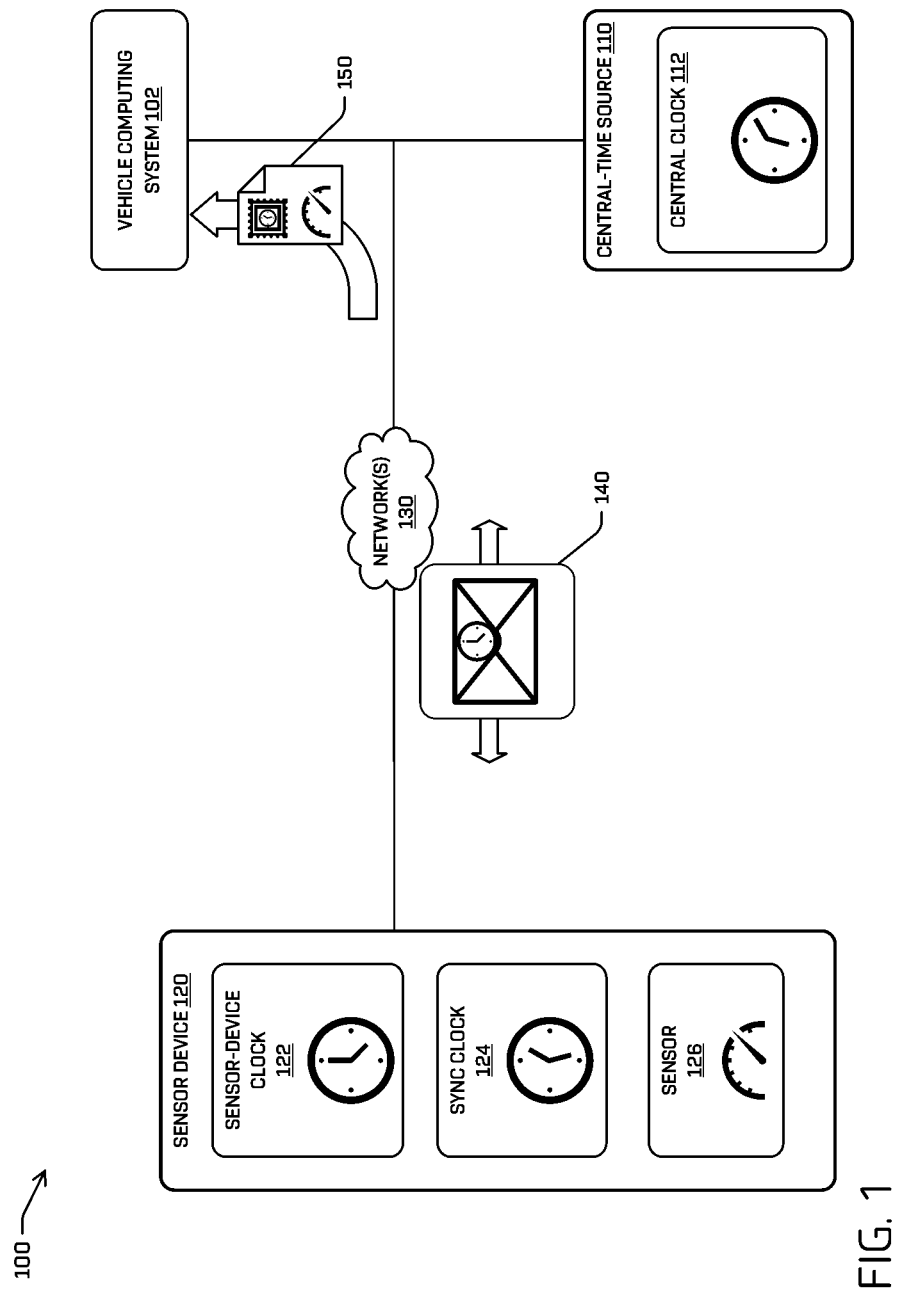
FIG. 1 illustrates a simplified illustration of a networked computer environment that is suitable to implement the technology described herein.

As discussed above, the standard Precision Time Protocol (PTP) defines how to perform clock synchronization across a network. The standard PTP (as defined by IEEE 1588) involves an exchange of time-synchronization messages sent back and forth over the network between a primary device and a secondary device.

The standard PTP presumes that the transmission time of a downlink message sent from the primary to the secondary is effectively the same as the transmission time of an uplink message returned from the secondary to the primary (i.e., central) device. That is, the transmission delays of the uplink and downlink messages are presumed to be effectively the same. This transmission delay is called network latency.

The standard PTP does not account for network jitter. Network jitter is a variation in network latency. That is, the transmission delay across messages may vary significantly affecting accurate synchronization. Jitter may be caused by many factors, including, for example, electromagnetic interference, crosstalk, network congestion, and the like.

The standard PTP presumes that no jitter exists because it presumes an idealized environment. As such, results from standard PTP are less accurate than is desired now, and/or it was unknown how to eliminate the effects of jitter. Thus, it was presumed that jitter was not significant to affect the clock synchronization. The application relates to a clock synchronization approach that no longer presumes that the network jitter is not significant enough to affect the synchronization across the network.

More particularly, this application relates to a robust clock synchronization across a computer network that presumes network jitter exists. Because of this, network devices effectively and accurately synchronize their clocks using the technology described in this application despite the presence of varying transmission delays on the computer network.

Unless the context indicates otherwise, the term computer network used herein is a network of digitally interconnected computers that use a set of common communication protocols for the purpose of sharing resources and/or communicating with each other. In some instances, a computer network may be described as a communication network.

Unless the context indicates otherwise, the term computer is an electronic machine that can be instructed to carry out sequences of arithmetic or logical operations automatically via computer programming. In some instances, the computer may be described as a computer device, network device, or simply a device.

While the examples are described herein within the context of an autonomous vehicle, the techniques are also applicable to semi-autonomous and manually driven vehicles, as well as any other system that requires precise synchronization given network latency jitter. The example vehicles described herein may include sensor devices that are synchronizing their clocks with central or PTP clocks of vehicles, especially for the purpose of accurately timestamping sensor measurements. Additional details regarding example vehicles with system systems that synchronize their clocks and perform timestamping can be found in U.S. patent application Ser. No. 16/142,865 (filed on Sep. 26, 2018) and Ser. No. 16/405,668 (filed on May 7, 2019), which are incorporated herein by reference in its entirety for all purposes.

The techniques described herein are applicable outside the context of vehicles. Indeed, the techniques described herein may be employed with networks that depend upon precise timing across the network, such as financial transactions, mobile telecommunications tower transmissions, sub-sea acoustic arrays, and power-distribution networks.

FIG. 1 illustrates a simplified illustration of a networked computer environment 100 that is suitable to implement the technology described herein. As depicted, the networked computer environment 100 is implemented as part of an autonomous vehicle. In other instances, the networked computer environment 100 may be implemented, for example, as part of a mobile telecommunications tower, within a computer system of industrial equipment, and the like.

As depicted, the networked computer environment 100 includes a vehicle computing system 102, a central-time source 110, a sensor device 120, and one or more computer network(s) 130 that interconnects them.

The vehicle computing system 102 may include one or more components that cause the vehicle computing system 102 and/or a vehicle to perform various operations based on input from the sensor devices 120. The one or more computer network(s) 130 may include a network switch, that takes in packets being sent by devices that are connected to its physical ports and sends them out again over other interconnected networks or direct connected links.

Switches are a common component of networks based on ethernet, Fibre Channel, Asynchronous Transfer Mode (ATM), and InfiniBand, among others. In general, though, most switches today use ethernet.

The central-time source 110 may include a network-connected device or a part thereof that has a central clock 112 to which the devices on the one or more computer network(s) 130 synchronize thereto. In some instances, the central-time source 110 may be called a time server, and the central clock 112 may be called a PTP clock. In addition, in some instances, the central-time source 110 may be called a first device, and the central clock 112 may be called a first clock.

The central clock 112 is a real-time clock (RTC) built into hardware that tracks time for the central-time source 110. For example, an RTC is constructed from an integrated circuit and is responsible for tracking the passage of time so that functions may be properly tracked and synchronized. In some instances, an RTC has a crystal oscillator that generates an electric signal of very precise frequency. This precise frequency is used to calculate the ongoing passage of time. Thus, it acts as a clock. In this case, the central clock 112 is the authorized clock that other network-connected devices reference to synchronize their clocks.

The sensor device 120 may be associated with a sensor-device clock 122, a synchronization ("sync") clock 124, and a sensor 126. Though the sensor device 120 or system 120 is depicted in FIG. 1 for illustrative purposes as a device, the description is not meant to be so limiting. The components of the sensor device 120 may be separate from one another. In some instances, the sensor device 120 may be called a second device, and the sensor-device clock 122 may be called a second clock.

The sensor 126 may be one or more sensors, such as, light detection and ranging (LIDAR) sensors, radio detection and ranging (RADAR) sensors, ultrasonic transducers, sound navigation and ranging (SONAR) sensors, location sensors (e.g., a global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, microphones, environment sensors (e.g., temperature sensors, humidity sensors, light sensors, pressure sensors, etc.), etc. The sensor 126 can measure and generate sensor data, which can be utilized by vehicle computing system 102.

The sensor-device clock 122 is an RTC of the sensor device 120. The sensor device 120 uses the sensor-device clock 122 to synchronizes its functionality internally. The present time of the sensor-device clock 122 and the central clock 112 are most likely different and perhaps remarkably different. Indeed, the present time of the sensor-device clock 122 and the central clock 112 are unrelated to each other. This is primarily because of clock drift.

Clock drift refers to several related phenomena where a clock does not run at exactly the same rate as another clock. This is true even after clocks are synchronized. For call clocks, after some time, the clock "drifts apart" or gradually desynchronizes from the other clock. All clocks are subject to drift, causing eventual divergence unless resynchronized. In particular, the drift of crystal-based clocks (like the example clocks described herein) used in computers requires some synchronization mechanism for any high-speed communication and time-sensitive coordinated functions.

The sync clock 124 is a resettable RTC of the sensor device 120. The resettable sync clock 124 tracks the passage of time like the sensor-device clock 122 does, but its present time value may be assigned (i.e., "set"). After the new value of the present time is set, the resettable sync clock 124 advances time from that new setting. Herein, the resettable sync clock 124 may be called a third clock.

Using the techniques described herein, the resettable sync clock 124 has a time that is synchronized with the central clock 112. Because of clock drift, the sensor device 120 will resynchronizes the resettable sync clock 124 on a regular basis or from time to time. For example, the central-time clock 112 may synchronize clocks as frequently as one-hundred twenty-eight times per second or every sixteen seconds.

As depicted in FIG. 1, the sensor-device clock 122 of the sensor device 120 is not resettable, but the sync clock 124 is. In other instances, the sensor-device clock 122 may have no sync clock 124. Instead, in such instances, the sensor device 120 has only the sensor-device clock 122, which is resettable. Accordingly, for such instances, actions described herein as acting upon the sync clock 124 would act upon the resettable sensor-device clock instead.

Figure 2:
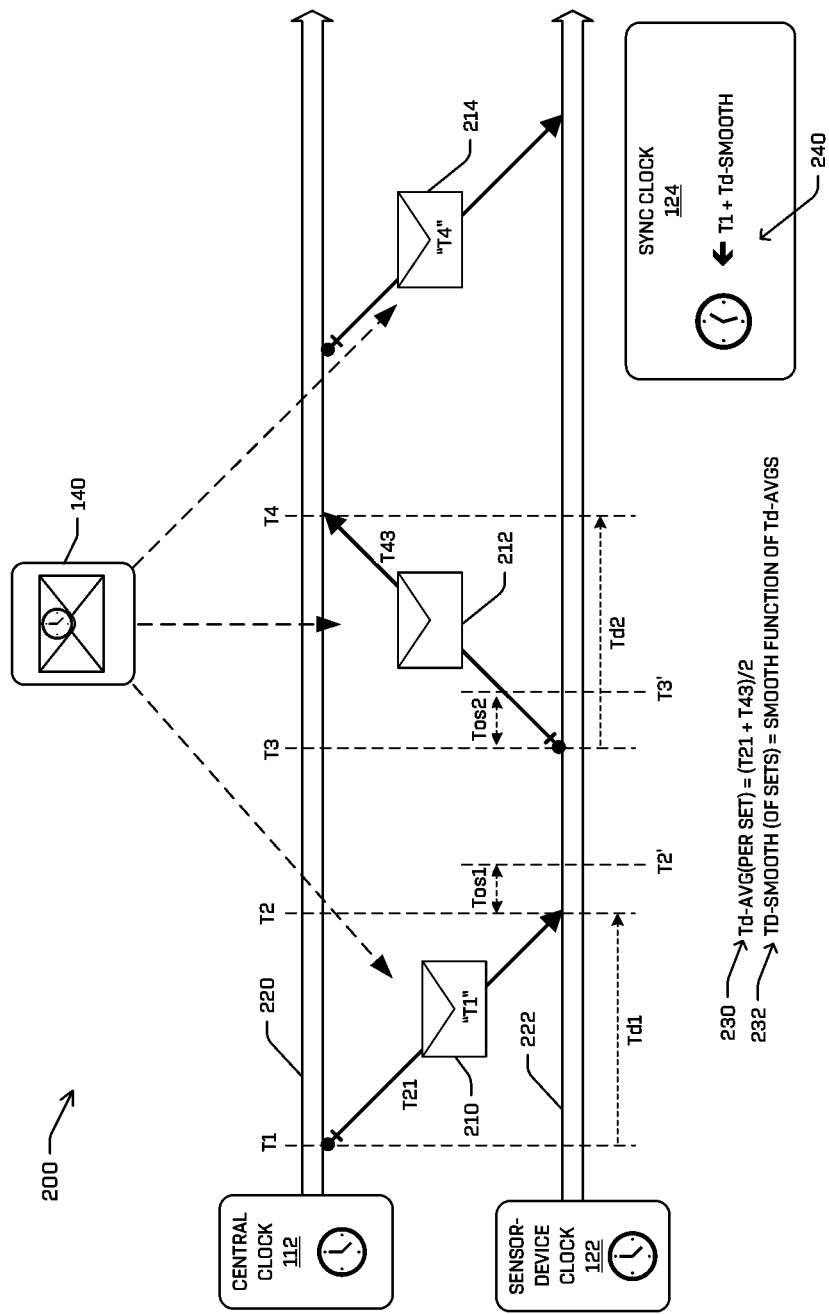
FIG. 2 illustrates transceiving of a set of time-synchronization messages in the networked computer environment of FIG. 1 in accordance with the technology described herein.

FIG. 2 illustrates a transceiving of a set 140 ("time-sync set") of time-synchronization messages in the networked computer environment 100. Each time-sync set is transceived between the central-time source 110 and the sensor device 120 over the one or more computer network(s) 130. Hereinafter, both FIGS. 1 and 2 are referenced in the description of the networked computer environment 100.

Unless the context indicates otherwise, the term transceiving includes sending and receiving messages over the one or more computer network(s) 130. For example, transceiving may include 1) the central-time source 110 sending a first message to the sensor device 120 (which may be described as the sensor device 120 receiving that first message from the central-time source 110) and/or 2) the sensor device 120 sending a second message to the central-time source 110 (which may be described as the central-time source 110 receiving that second message from the sensor device 120).

As shown in FIG. 2, each time-sync set 140 includes three time-synchronization messages ("time-sync messages"): An initial time-sync message 210, an acknowledgment time-sync message 212, and a responsive time-sync message 214. Alternatively, these messages may be called the first, second, or third time-sync messages, respectively.

FIG. 2 shows a central timeline 220 of the central clock 112 and a sensor-device timeline 222 of the sensor device 120. As noted by the right-pointing arrows of the timelines, the timelines indicate the advancing time of their respective clocks. For example, the central timeline 220 advances from left to right, which the direction that its arrow points.

Note that the central clock 112 and the sensor-device clock 122 are not set to the same time and are not yet synchronized. Furthermore, the central clock 112 and the sensor-device clock 122 have different clock drifts. Thus, while the rates at which time of these clocks advances may be close, they are unlikely to match.

To synchronize the sensor device 120 to the central clock 112, the central-time source 110 sends a plurality of time-sync sets to the sensor device 120. The plurality of time-sync sets includes two or more sets, like that of the time-sync set 140. In some instances, the plurality may be called a window. Depending on the implementation, the number of sets may be a few as three or five or as many as fifty or a hundred.

With each time-sync set 140, the transceiving includes the central-time source 110 sending the initial time-sync message 210 to the sensor device 120. The central-time source 110 sends the initial time-sync message 210 at a first-device send time (T1) according to the central clock 112. The initial time-sync message 210 includes first timing data, such as the first-device send time (T1). In FIG. 2, a "T1" notation is shown in quotes over the representation of the initial time-sync message 210 to indicate the inclusion of the first-device send time (T1) in that message.

The sensor device 120 receives, a second-device receipt time (T2') according to the sensor-device clock 122, the initial time-sync message 210. The following indicates the depicted notations for time measurements or calculations related to the initial time-sync message 210 in FIG. 2:

T1=the first-device send time

T2=a time of the central clock 112 that the initial time-sync message 210 was received T2'=a time of the sensor-device clock 122 that the initial time-sync message 210 was received ("second-device receipt time")

Td1=message-transmission duration of the initial time-sync message 210

Tos1=time offset between T2 and T2'

T21=effective transmission duration (Td1+Tos1) of the initial time-sync message 210

After the initial time-sync message 210 is received, the central-time source 110 is aware of the first-device send time T1. However, the central-time source 110 is not aware of and cannot calculate any of the other time measurements or calculations (e.g., T2, T2', Td1, Tos1, and T21).

After the initial time-sync message 210 is received, the sensor device 120 is aware of the first-device send time T1 because that value was supplied in the received initial time-sync message. In addition, the sensor device 120 is aware of the second-device receipt time T2'. However, the sensor device 120 is not aware of and cannot calculate any of the other time measurements or calculations (e.g., T2, Td1, Tos1, and T21).

Once the sensor device 120 receives the initial time-sync message 210 of the time-sync set 140, the sensor device stores the first-device send time T1. Also, the sensor device 120 stores the second-device receipt time T2'.

In response to the received initial time-sync message 210, the sensor device 120 sends the acknowledgement time-sync message 212 to the central-time source 110.

Thus, the transceiving further includes the sensor device 120 sending the acknowledgment time-sync message 212 to the central-time source 110. The sensor device 120 sends the acknowledgment time-sync message 212 at a second-device send time (T3') according to the sensor-device clock 122. The central-time source 110 receives, at a first-device receipt time (T4) according to the central clock 112, the acknowledgment time-sync message 212.

The following indicates the depicted notations for time measurements or calculations related to the acknowledgement time-sync message 212 in FIG. 2:

T3=a time of the central clock 112 that the acknowledgement time-sync message 212 is sent T3'=a time of the sensor-device clock 122 that the acknowledgement time-sync message 212 is sent ("second-device sent time")

Td2=message-transmission duration of the acknowledgement time-sync message 212

Tos2=time offset between T3 and T3'

T43=effective transmission duration (Td2−Tos2) of the acknowledgement time-sync message 212

T4=a present time of the central clock 112 that the acknowledgement time-sync message 212 is received ("first-device receipt time")

After the acknowledgement time-sync message 212 is sent, the sensor device 120 stores the second-device sent time T3'. In addition to the first-device send time T1 and second-device receipt time T2', the sensor device 120 is aware of the second-device sent time T3'. However, the sensor device 120 is not yet aware of and cannot calculate any of the other time measurements or calculations (e.g., T2, Td1, Tos1, T21, T3, T4, Tos2, and T43).

After the acknowledgement time-sync message 212 is received, the central-time source 110 stores the first-device receipt time T4. However, the central-time source 110 is not aware of and cannot calculate any of the other time measurements or calculations (e.g., T2, T2', Td1, Tos1, T21, T3, T3', Tos2, and T43).

After receiving the acknowledgement time-sync message 212, the transceiving includes the central-time source 110 responding to the sensor device 120 with the responsive time-sync message 214. The responsive time-sync message 214 includes second timing data, such as the first-device receipt time (T4). In FIG. 2, a "T4" notation is shown in quotes over the representation of the responsive time-sync message 214 to indicate the inclusion of the first-device receipt time (T4) in that message. The sensor device 120 receives the responsive time-sync message 214.

The duration of a message transmission (e.g., Td1 and Td2) is the time elapsed while a message travels from the sender to the receiver across the one or more computer network(s) 130. For example, the message-transmission duration Td1 is the time elapsed for the transmission of the initial time-sync message 210 from the central-time source 110 to the sensor device 120. The message-transmission duration may be called a time delay herein.

For each set (such as time-sync set 140), the sensor device 120 may determine a time delay data. The time delay data may be associated with an average based on transmission duration of the initial time-sync message and the acknowledgement time-sync message.

That is, the sensor device 120 may determine an average message-transmission duration (Td−avg) of, at least, the first two time-sync messages (i.e., the initial time-sync messages 210 and the acknowledgement time-sync message 212). That is, the average (Td-avg) of the message-transmission duration of the time-sync set 140 is the mean transmission duration of the initial time-sync message 210 and the acknowledgement time-sync message 212 of the time-sync set. Equation 230 in FIG. 2 represents the determination of the Td−avg for the time-sync set 140 by the sensor device 120.

Equation 230 shows Td−avg (per set)=(T21+T43)/2. That is, the average message-transmission duration per set (Td−avg (per set)) is determined by averaging the effective transmission durations (T21 and T43) of the initial time-sync message 210 and the acknowledgement time-sync message 212.

For this determination, the time offsets (Tos1 and Tos2) of the initial time-sync message 210 and the acknowledgement time-sync message 212 are identical or effectively so. Thus, the time offsets (Tos1 and Tos2) can be ignored for the determination of the average message-transmission duration per set. Consequently, the average message-transmission duration per set may be determined by averaging the effective transmission durations (T21 and T43) of the initial time-sync message 210 and the acknowledgement time-sync message 212.

For the plurality of time-sync sets, the sensor device 120 may calculate a smoothing (TD-smooth) of the time delay data. The time delay data including the average of the message-transmission duration of the sets of the plurality. That is, the sensor device 120 applies a smoothing function to the averages (Td–avg) of the time delay across all of the sets of the plurality. Equation 232 in FIG. 2 represents the calculation of the TD–smooth for the plurality of time-sync sets by the sensor device 120.

Equation 232 shows TD–smooth (per plurality of sets) =smoothing function of Td–avgs of those sets. That is, the smoothed Td–avgs of the sets is calculated by applying a smoothing function to the Td–avgs of the sets of the plurality.

A smoothing function is a function that has continuous derivatives up to some desired order over some domain. A function can therefore be said to be smooth over a restricted interval. A smoothing function creates an approximating function that is applies to a data set that captures patterns in the data, while leaving out noise or other fine-scale structures/rapid phenomena. In smoothing, the data points of a signal (e.g., Td–avgs of sets) are modified so individual points higher than the adjacent points are reduced, and points that are lower than the adjacent points are increased leading to a smoother signal.

After the TD–smooth is calculated, the sensor device 120 sets the resettable sync clock 124 to a combination of a time (e.g., the T1) at the central-time source 110 and the TD–smooth. This is illustrated in FIG. 2 at 240. Herein and in this context, setting the resettable sync clock 124 includes assigning a present time value to a time (e.g., the T1) at the central-time source 110. Thus, after this new value of the present time is set, the resettable sync clock 124 advances time from that new setting.

The moving average mentioned above is an example of a smoothing function. Other suitable smoothing functions include additive smoothing, butterworth filtering, Chebyshev filtering, digital filtering, elliptic filtering, exponential smoothing, Kalman filtering, kernel smoothing, Kolmogorov-Zurbenko filtering, Laplacian smoothing, local regressing, low-pass filtering, moving averaging, Ramer-Doublas-Peucker downsampling, Savitzky-Golay smooth filtering, smooth splining, and stretched grid approximating.

The networked computer environment 100 uses moving averages as is smoothing function. Thus, for the plurality time-sync sets, the sensor device 120 may calculate a moving average (TD–movavg) of the message-transmission duration of the Td–avgs of the sets of the plurality. That is, the sensor device 120 calculates the average of the Td–avgs across all of the sets of the plurality. For example, consider that a plurality of five sets that have Td–avgs of 11, 12, 13, 16, and 13 milliseconds (ms) respectively. The TD–movavg of the plurality would be 13 ms.

The moving average may be a simple moving average that uses just the Td–avgs from the plurality, cumulative moving average that uses calculations from previous pluralities, weighted moving averages that weight the Td–avgs from some sets different from the Td–avgs of other sets in the plurality, exponential moving average, and other types of moving averages. A moving average may also be called a rolling average, running average, or moving mean. After the TD–movavg is calculated, the sensor device 120 sets the resettable sync clock 124 to a combination of a time (e.g., the T1) at the central-time source 110 and the TD–movavg.

After the resettable sync clock 124 is synchronized to a time (e.g., the T1) at the central-time source 110, the sensor device 120 may generate a sensor-input reading 150 and send it across the one or more computer network(s) 130 to the vehicle computing system 102. To do this, the sensor device 120 gathers sensor data from a sensor 126. For example, the sensor 126 may be a camera. If so, the sensor data may be an image captured by that camera. The sensor device 120 grabs the present time value from the resettable sync clock 124. The sensor device 120 combines the captured image with the timestamp into the sensor-input reading 150 and sends it across the one or more computer network(s) 130 to the vehicle computing system 102.

The vehicle computing system 102 also receives other sensor data with synchronized timestamps from other sensor devices (not shown) of the vehicle. Since the timestamps of the incoming sensor data are reliably synchronized, the vehicle computing system 102 can make inferences and calculations based on concurrent sensor data from multiple different sensor devices.

The central-time source 110 may be the synchronized time source for devices, such as the sensor device 120, connected to the one or more computer network(s) 130. The one or more computer network(s) 130 may have a hierarchical relationship with other time sources on the one or more computer network(s) 130 or on other connected networks. For example, the central-time source 110 may be connected via the one or more computer network(s) 130 or another connected network to a grand-central time source. This grand-central time source may synchronize the central clock 112 in an analogous or similar manner as the clock synchronization described herein between the central-time source 110 and the sensor device 120.

In some instances, the sensor device 120 may operation clock-synchronization using standard PTP unless the sensor device 120 is triggered to change to the technology described herein. The sensor device 120 may track variance in drift time delay data (e.g., Td–avg) between time-sync sets. If the variance in the time-delay drift exceeds a defined threshold, the sensor device 120 may trigger the technology described herein to perform clock synchronization.

In some instances when the variance threshold is exceeded, the sensor device 120 may bias or weight the smoothing of the time delay data toward more recently processed sets.

In some instances, the sensor device 120 may include the T2' and the T3' into the acknowledgement time-sync message 212. If so, the central-time source 110 may perform the determinations of the time delay data of each set and calculate the smoothing of time delay data of the plurality. The central-time source 110 may insert those determinations and calculations into the responsive time-sync message 214 or an additional time-sync message. In this way, the sensor device 120 would use the determinations and calculations provided by the central-time source 110.

In such instances, the central-time source 110 may determine clock synchronization using both standard PTP approach and using the technology described herein. If so, the central-time source 110 may direct the sensor device 120 as to which of the two clock-synchronization determinations to set the resettable sync clock 124.

Figure 3:
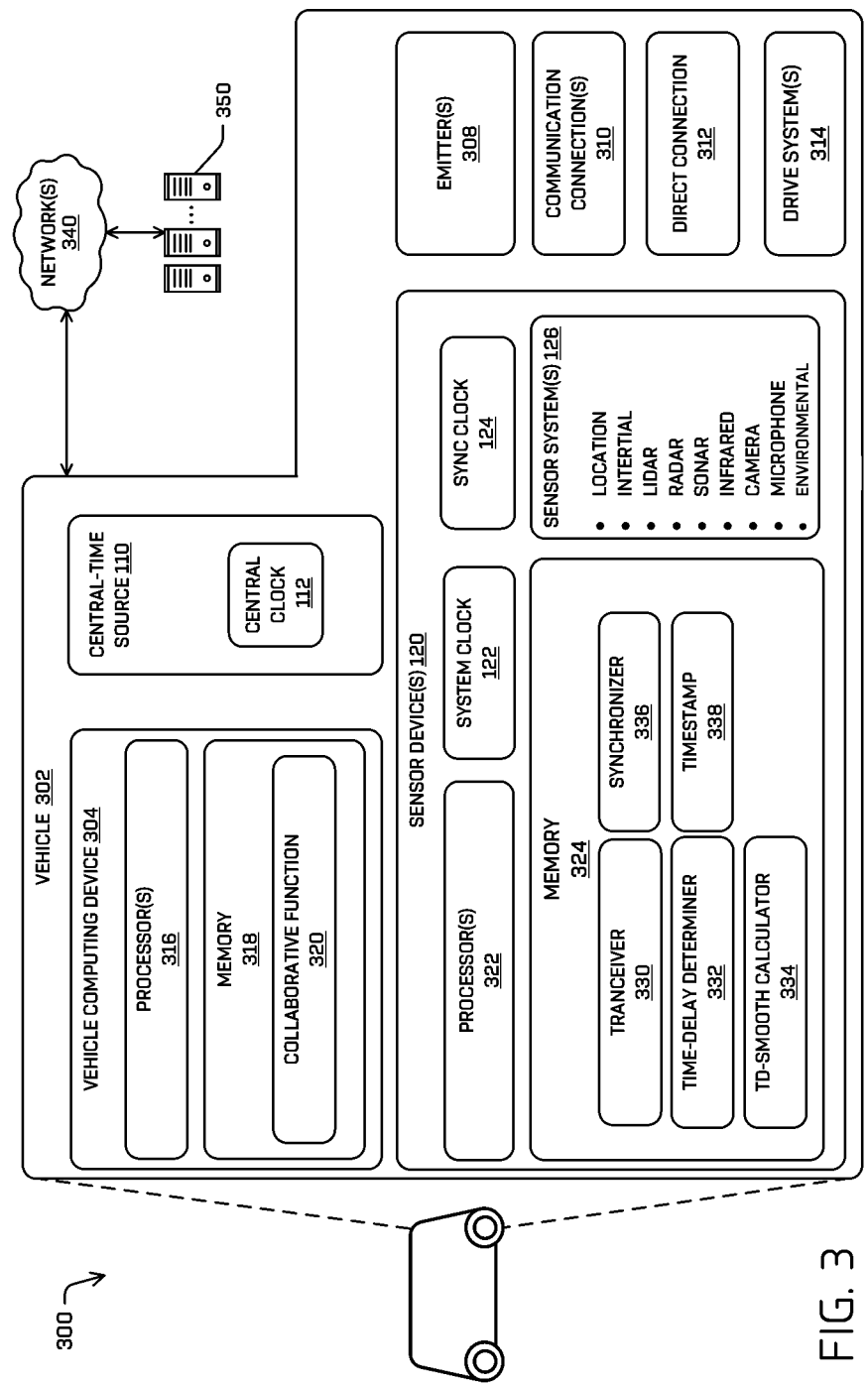
FIG. 3 is a block diagram of an example computing system 300 that implements robust clock synchronization across a computer network that presumes network jitter exists, in accordance with the technology described herein.

FIG. 3 is a block diagram of an example computing system 300 for implementing the techniques described herein. In at least one example, the computing system 300 may include a vehicle 302.

In some examples, the vehicle 302 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 302 can be configured to control all functions from start to completion of the trip, including all parking functions, it may not include a driver and/or controls for driving the vehicle 302, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times to those that are partially or fully autonomously controlled.

The vehicle 302 may include one or more vehicle computing device(s) 304, the central-time source 110, one or more of the sensor devices 120, one or more emitters 308, one or more communication connections 310, at least one direct connection 312, and one or more drive systems 314.

The vehicle computing device(s) 304 may include one or more processors 316 and memory system 318 communicatively coupled with the one or more processors 316. In the illustrated example, the memory system 318 of the vehicle computing device(s) 304 stores a collaborative function component 320. The central-time source 110 may include a network-connected device or a part thereof that has the central clock 112, which the devices on the one or more computer network(s) 130 synchronize thereto.

The one or more sensor devices 120 may include one or more processors 322 and memory system 324 communicatively coupled with the one or more processors 322. one or more sensor devices 120 may include the sensor-device clock 122, the resettable sync clock 124, and the one or more sensors 126. In the illustrated example, the memory system 324 of the one or more sensor devices 120 stores a transceiver component 330, a time-delay determiner component 332, a TD–smooth calculator component 334, a synchronizer component 336, and a timestamp component 338.

In at least one example, the one or more sensors 126 of the one or more sensor devices 120 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The one or more sensors 126 may include multiple instances of each of these or other types of sensors. For instance, the LIDAR sensors may include individual LIDAR sensors located at the corners, front, back, sides, and/or top of the vehicle 302. As another example, the camera sensors may include multiple cameras disposed at various locations about the exterior and/or interior of the vehicle 302. The one or more sensors 126 may provide input to the vehicle computing device(s) 304. Additionally or alternatively, the one or more sensors 126 may send sensor data, via the one or more networks 340 and/or to remote computing system(s) 350 at a particular frequency, after a lapse of a predetermined period of time, in near real-time, etc.

In at least one example, the transceiver component 330 may be configured to transceive a plurality of sets of time-sync messages between the sensor device 120 (i.e., the second device) and the central-time source 110 (i.e., the first device). For this example, the transceiving includes the transceiver component 330 sending and receiving messages over a computer network within the vehicle 302, the direct connection 312 between devices of the vehicle, or over the network 340. The transceiver component 330 may perform transceiving, for example, in the manner described above with regard to the descriptions of FIGS. 1 and 3 and/or below with regard to the descriptions of the example processes of FIGS. 4-6 below.

The time-sync set 140 is an example of one of the sets of time-sync messages the transceived plurality (i.e., group) of such sets. Each set may include two to three messages. For example, the time-sync set 140 includes three messages: The initial (i.e., first) time-sync message 210, the acknowledgement (i.e., second) time-sync message 212, and the responsive (i.e., third) time-sync message 214. Of which, the time delay data (e.g., Td–avg) is determined based on the initial time-sync message 210 and the acknowledgement time-sync message 212.

In the initial time-sync message 210 and the responsive time-sync message 214, the central-time source 110 information about times at the central-time source 110 according to the central clock 112 that the initial time-sync message 210 was sent and the acknowledgement time-sync message 212 was received by the central-time source 110.

In at least one example, the time-delay determiner component 332 may be configured to determine the time delay data (e.g., Td–avg). The time delay data may include the average (Td–avg) of the message-transmission duration of messages of the time-sync set 140. Equation 230 in FIG. 2 represents an example of the determination that the time-delay determiner component 332 may perform.

In at least one example, the TD–smooth calculator component 334 may be configured to calculate the smoothing function (TD–smooth) of the time delay data of the sets of the plurality. That is, the TD–smooth calculator component 334 may apply a smoothing function to the Td–avgs of the sets of the plurality. Equation 232 in FIG. 2 represents an example of the calculation that the TD–smooth calculator component 334 may perform.

In at least one example, the synchronizer component 336 may be configured to set the resettable sync clock 124 to a combination of a time (e.g., the T1) at the central-time source 110 and the TD–smooth (or TD–movavg). This is illustrated in FIG. 2 at 240.

In at least one example, the timestamp component 338 may be configured to generate the sensor-input reading 150 and send to the vehicle computing device 304, the remote computing system 350, or another computing system via computer network within the vehicle 302, the direct connection 312 between devices of the vehicle, or over the network 340. The sensor 126 takes a measurement of a condition observable by the sensor at a measurement time according to the resettable sync clock 124. The timestamp component 338 generates a timestamp based on the measurement time. The timestamp component 338 combines the measurement with the timestamp into the sensor-input reading 150 and sends it across the one or more computer network(s) 130 to the vehicle computing device 304, the remote computing system 350, or another computing system.

In at least one example, the collaborative function component 320 may be configured to receive multiple sensor-input readings, such as the sensor-input reading 150, from multiple of the sensor devices 120 or from multiple sensors on one of the sensor devices 120. Based on the timestamps in the multiple sensor-input readings, the collaborative function component 320 may make time-sensitive inferences and calculations based on sensor data in the multiple received sensor-input readings. The collaborative function component 320 can rely on the timestamps of the multiple received sensor-input readings to be synchronized with each other because the sensor devices 120 are reliably synchronized in accordance with the technology described herein.

By way of example, the vehicle computing device(s) 304 may be considered to be a primary system and another system (not shown) may be a secondary system. The primary system may generally perform processing to control how the vehicle maneuvers within an environment. The primary system may implement various artificial intelligence (AI) techniques, such as machine learning, to understand an environment around the vehicle 302 and/or instruct the vehicle 302 to move within the environment. For example, the primary system may implement the AI techniques to receive input that may be used to determine whether an event has occurred, detect the proximity of vehicles and objects around the vehicle 302, determine that an impact has occurred, control lights and screens, navigation, data communications, audio and/or video communications, and so on. In some examples, the primary system may process sensor data from multiple types of sensors on the vehicle, such as light detection and ranging (LIDAR) sensors, radar sensors, image sensors, depth sensors, cameras, and the like, within the one or more sensor devices 120.

Although depicted in FIG. 3 as residing in the memory system 318 for illustrative purposes, it is contemplated that the collaborative function component 320 and other one or more system controllers (not shown) may additionally, or alternatively, be accessible to the vehicle 302 (e.g., stored on, or otherwise accessible by, memory remote from the vehicle 302, such as, for example, on a memory system of a remote computing system 350). Similarly, the collaborative function component 320 are depicted as residing in a memory system 318 of the vehicle computing device 304, this component may additionally, or alternatively, be implemented within other on-board computing devices or may be accessible to the vehicle 302 (e.g., stored on, or otherwise accessible by, memory remote from the vehicle 302, such as, for example, on a memory system of the remote computing system 350).

In at least one example, the collaborative function component 320 or the one or more sensor devices 120 may include functionality to communicate with remote operations that is implemented at the remote computing system 350. The remote operations may also be called teleoperations. The remote operations include the one or more remote computing devices 350 with one or more human operators or teleoperators. As the name implies, the remote operations are physically remote from the vehicle 302, but wirelessly in communication with the vehicle 302 via the one or more communication connection(s) 310. Such communication may include data, control, audio, and/or video.

The remote operations monitors and tracks the vehicle 302 and its systems, sensors, and components. The remote operations may control or direct some aspects of the vehicle's actions, such as navigation, safety, and the like. Indeed, in some instances, the teleoperators in the remote operations may drive the vehicle 302.

Additional examples that may be performed by remote operations as implemented at the remote computing system 350 may be found in U.S. Patent Application Publication No. 20200183394 and U.S. Pat. Nos. 10,303,961 and 10,268,191, which are incorporated by reference herein in their entirety and for all purposes.

The memory system 318 may further include one or more maps (not shown) that may be used by the vehicle 302 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retro-reflectivity information, BRDF information, BSSRDF information, and the like). In one example, a map may include a three-dimensional mesh of the environment. In some examples, the vehicle 302 may be controlled based at least in part on the maps.

As can be understood, the components discussed herein (e.g., the collaborative function component 320, the transceiver component 330, the time-delay determiner component 332, the TD-smooth calculator component 334, the synchronizer component 336, and the timestamp component 338) are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory systems 318 and 324 may be implemented as a neural network.

The vehicle 302 may also include one or more emitters 308 for emitting light and/or sound, as described above. The emitters 308 in this example include interior audio and visual emitters to communicate with passengers of the vehicle 302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or another indicator of vehicle action (e.g., indicator lights, signs, light arrays, etc.), and one or more audio emitters (e.g., speakers, speaker arrays, horns, etc.) to communicate with pedestrians or other nearby vehicles audibly, one or more of which comprising acoustic beam steering technology.

Vehicle 302 may also include the one or more communication connection(s) 310 that enables the communication between the vehicle 302 and one or more another local or remote computing system(s). For instance, the communication connection(s) 310 may facilitate communication with other local computing device(s) on the vehicle 302 and/or the drive system(s) 314. Also, the communication connection(s) 310 may allow the vehicle to communicate with other nearby computing device(s) (e.g., the remote computing system(s) 350, other nearby vehicles, etc.) and/or remote operations for receiving sensor data.

The communications connection(s) 310 may include physical and/or logical interfaces for connecting the vehicle computing device(s) 304 to another computing device or a network, such as the network(s) 340. For example, the communications connection(s) 310 can enable Wi-Fi-based communication such as via frequencies defined by the IEEE 802.11 standards, short-range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 may include one or more drive systems 314. In some examples, the vehicle 302 may have a single drive system 314. In at least one example, if the vehicle 302 has multiple drive systems 314, individual drive systems 314 may be positioned on opposite ends of the vehicle 302 (e.g., the front and the rear, etc.). In at least one example, the drive system(s) 314 may include one or more sensor devices to detect conditions of the drive system(s) 314 and/or the surroundings of the vehicle 302. By way of example and not limitation, the sensor 126 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, radar sensors, etc. Some sensors, such as the wheel encoders may be unique to the drive system(s) 314. In some cases, the sensor on the drive system(s) 314 may overlap or supplement corresponding systems of the vehicle 302.

The drive system(s) 314 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate the loss of traction and maintain control, an HVAC system, lighting (e.g., lighting such as head/tail lights to illuminate an exterior surrounding of the vehicle), and one or more other systems (e.g., cooling system, safety systems, on-board charging system, other electrical components such as a DC/DC converter, a high voltage junction, a high voltage cable, charging system, charge port, etc.). Additionally, the drive system(s) 314 may include a drive system controller that may receive and preprocess data from the sensor device and to control the operation of the various vehicle systems. In some examples, the drive system controller may include one or more processors and memory communicatively coupled with the one or more processors. The memory may store one or more components to perform various functionalities of the drive system(s) 314. Furthermore, the drive system(s) 314 may also include one or more communication connection(s) that enable communication by the respective drive system with one or more other local or remote computing system(s).

In at least one example, the direct connection 312 may provide a physical interface to couple the one or more drive system(s) 314 with the body of the vehicle 302. For example, the direct connection 312 may allow the transfer of energy, fluids, air, data, etc. between the drive system(s) 314 and the vehicle. In some instances, the direct connection 312 may further releasably secure the drive system(s) 314 to the body of the vehicle 302.

The processor(s) 316 of the vehicle 302 and the processor(s) 322 of the one or more sensor devices 120 may be any suitable processor capable of executing instructions to process data and perform operations as described herein.

While not depicted, the central-time source 110 may have its own processor(s), memory system, and functional components.

By way of example and not limitation, the processor(s) 316 and 322 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory systems 318 and/or 324 are examples of non-transitory computer-readable media. The memory systems 318 and/or 324 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory systems 318 and/or 324 may include at least a working memory and a storage memory. For example, the working memory may be a high-speed memory of limited capacity (e.g., cache memory) that is used for storing data to be operated on by the processor(s) 316 and/or 322. In some instances, the memory systems 318 and/or 324 may include a storage memory that may be a lower-speed memory of relatively large capacity that is used for long-term storage of data. In some cases, the processor(s) 316 and/or 322 cannot operate directly on data that is stored in the storage memory, and data may need to be loaded into a working memory for performing operations based on the data, as discussed herein.

It should be noted that while FIG. 3 is illustrated as a distributed system. In alternative examples, components of the vehicle 302 may be associated with the remote computing system(s) 350 and/or components of the remote computing system(s) 350 may be associated with the vehicle 302. That is, the vehicle 302 may perform one or more of the functions associated with the remote computing system(s) 350, and vice versa.

Figure 4:
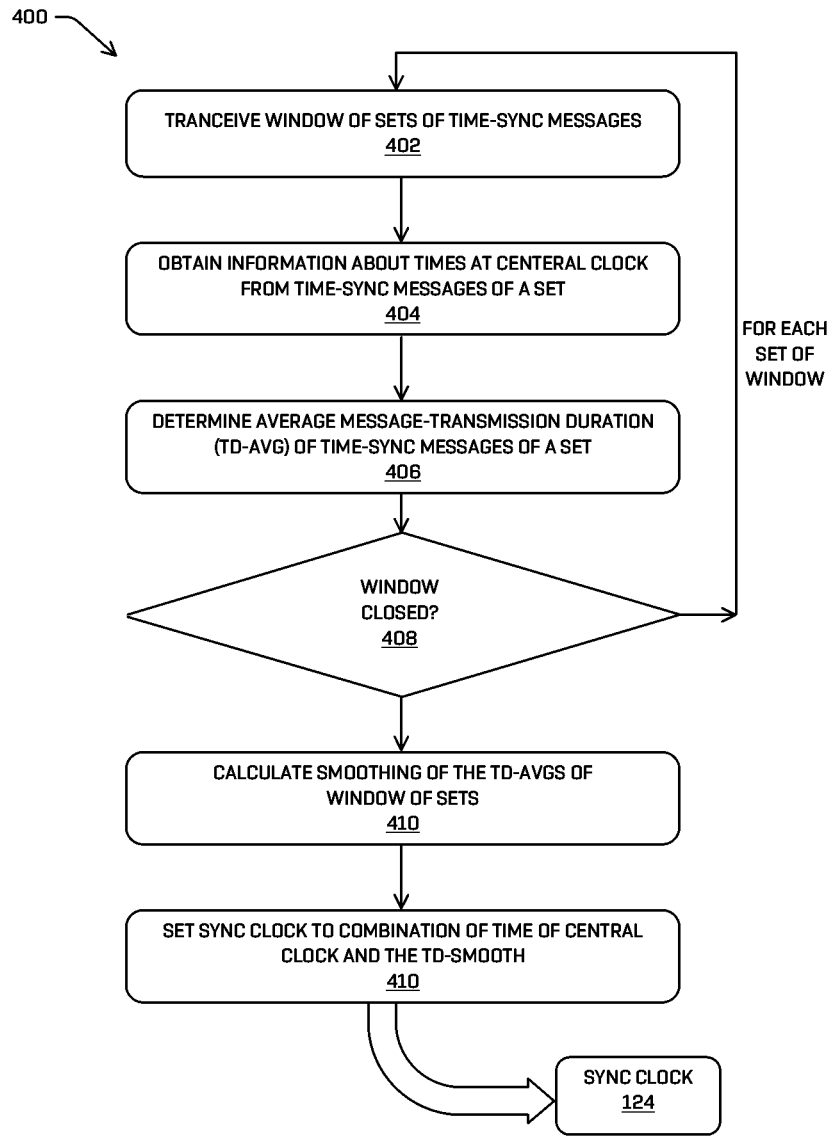
FIGS. 4-6 illustrates example processes of robust clock synchronization across a computer network that presumes network jitter exists, in accordance with certain techniques described herein.
Figure 5:
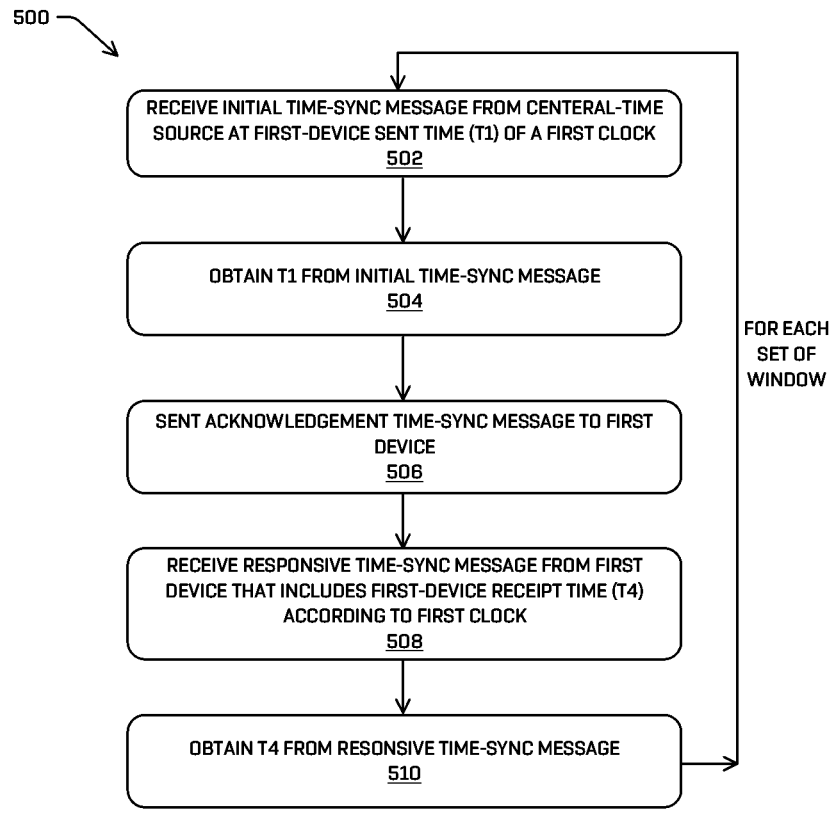
Figure 6:
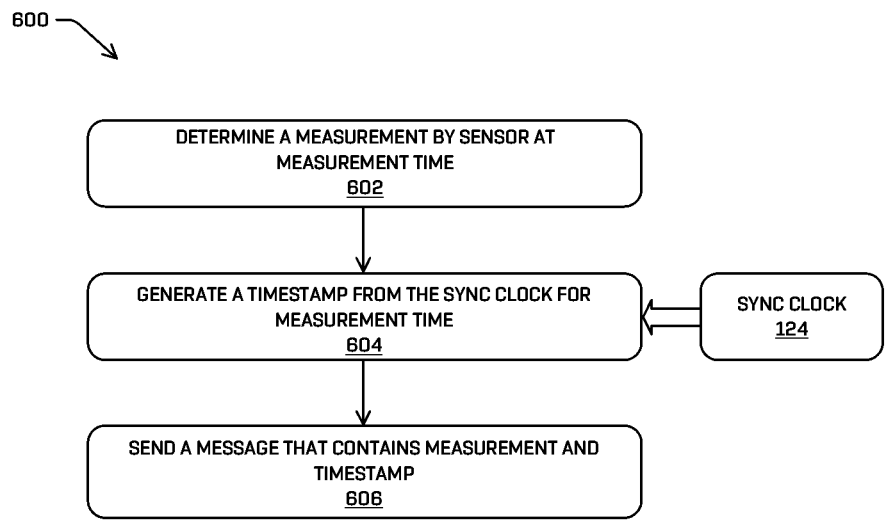

FIGS. 4-6 illustrate an example processes 400, 500, and 600 that implements a clock synchronization approach that no longer presumes that the network jitter is not significant enough to affect the synchronization across the network. In some instances, some or all of the example processes 400, 500, and 600 may be performed by one or more components of the networked computer environment 100 or the computing system 300, as described herein. For instance, the example processes 400, 500, and 600 may be described with reference to the vehicle computing device 304, the central-time source 110, and/or the one or more sensor devices (such as sensor device 120) of FIGS. 1-3. However, it is contemplated that example processes 400, 500, and 600 also may utilize computing environments and architectures other than those depicted in the networked computer environment 100 or the computing system 300.

Hereafter, the example processes 400, 500, and 600 include reference to a first device and a first clock, which may be implemented, for example, by the central-time source 110 and the central clock 112, as depicted in FIGS. 1-3 and as described in the accompanying descriptions of FIGS. 1-3. Hereafter, the example processes 400, 500, and 600 include reference to a second device and a second clock, which may be implemented, for example, by the sensor device 120 and the sensor 126, as depicted in FIGS. 1-3 and as described in the accompanying descriptions of FIGS. 1-3.

Hereafter, the example process 400 is described as being implemented by the example computing system in the networked computer environment 100. The computing system includes components depicted as part of the networked computer environment 100 of FIG. 1.

At operation 402, the example computing system transceivers, via a communications network, the time-sync messages of each set of a window of sets of such messages. The time-sync set 140 is an example of such a set. A window is a sequence of multiple (i.e., a plurality of) sets of time-sync messages. Operation 402 is repeated for each set of the window. Once the window is closed (i.e., completed), then operation 402 repeats with the first set of the next window.

The transceiving of operation 402 includes, for example, a first device (e.g., the central-time source 110) sending a first time-sync message to a second device (e.g., the sensor device 120). Alternatively, this may be described as the second device receiving that first time-sync message from the first device. Further, the transceiving of operation 402 includes, for example, the second device sending a second time-sync message to the first device. Alternatively, this may be described as the first device receiving that second time-sync message from the second device. Further still, the transceiving of operation 402 includes, for example, the first sending a third time-sync message to the second device. Alternatively, this may be described as the second device receiving that third time-sync message from the first device. The example process 500 of FIG. 5 provides some additional details about operation 402.

At operation 404, the example computing system, for each set of the window, obtains information about times (such as T1 and T4 of FIG. 2) at a first clock from the time-sync messages received from the first device as part of each set transceived as part of operation 402. The example process 500 of FIG. 5 provides some additional details about operation 404.

At operation 406, the example computing system, for each set of the window, may determine a time delay data. The time delay data may be associated with an average based on transmission duration of at least two of the time-sync messages of the set.

For example, the example computing system may determine an average message-transmission duration (Td–avg) of, at least, the first time-sync message and the second time-sync message. Equation 230 in FIG. 2 represents the determination of operation 406.

At operation 408, the example computing system determines whether the window is closed. That is, the example computer system determines whether the sequence of sets in the window have completed. If not, then operations 402-406 repeat on a loop. If the last set in the window was just processed by operations 402-406, then the example process 400 proceeds to operation 410.

At operation 410, the example computing system calculates a smoothing (TD-smooth) of the time delay data. The calculation may include an application of a smoothing function to the averages (Td–avg) of the time delay across all of the sets of the window. Equation 232 in FIG. 2 represents the determination of operation 410.

At operation 412, the example computing system sets a synchronization clock (such as the resettable sync clock 124) to a time value that is a combination of time of the central clock (such as the central clock 112) and the calculated smoothed Td–avgs. The setting of the resettable sync clock 124 is shown using a curved large arrow in FIG. 4.

Hereafter, the example process 500 is described as being implemented by a second device, such as the one or more sensor devices 120 of the networked computer environment 100 or of the computing system 300. In example process 500 of FIG. 5, operations 502, 506, and 508 provide more specifics of operation 402 of example process 400. In addition, operations 504 and 510 provide cover more specifics of operation 404 of the example process 400.

At operation 502, the second device receives the initial time-sync message 210 from a first device (e.g., the central-time source 110) comprising the first-device send time (T1) of a first clock (e.g., central clock 112). The initial time-sync message 210 includes first timing data, such as the T1. The second device receives the initial time-sync message 210 at the second-device receipt time (T2') according to a second clock (e.g., sensor-device clock 122).

At operation 504, the second device obtains the T1 from the initial time-sync message 210.

At operation 506, the second device sends the acknowledgment time-sync message 212 to the first device. The second device sends the acknowledgment time-sync message 212 comprising the second-device send time (T3') according to the second clock.

After receiving the acknowledgment time-sync message 212, the first device responds to the second device with the responsive time-sync message 214. The responsive time-sync message 214 includes second timing data, such as the first-device receipt time (T4) of the responsive time-sync message 214.

At operation 508, the second device receives the responsive time-sync message 214 from the first device. The responsive time-sync message 214 includes the first-device receipt time (T4) according to the first clock.

At operation 510, the second device obtains the T4 from the responsive time-sync message 214. Example process 500 loops for each set in the window of sets.

Hereafter, the example process 600 is described as being implemented by a second device, such as the one or more sensor devices 120 of the networked computer environment 100 or of the computing system 300.

At operation 602, the second device determines a measurement of a condition observable by the sensor at a measurement time according to a resettable sync clock, such as the resettable sync clock 124. The measurement is made by a sensor, such as one or more sensors 126.

At operation 604, the second device generates a timestamp that is based on the measurement time.

At operation 606, the second device sends the measurement and the timestamp to a computing system on a network, such as the one or more network(s) 130 or network(s) 340.

EXAMPLE CLAUSES

A: A system comprising: a first device having a first clock; a second device having a second clock; one or more processors; and one or more non-transitory computer-readable media storing computer-executable instructions that, when executed, cause the system to perform operations comprising: transceiving, via a communication network between the first device and second device, a plurality of sets of time-synchronization messages, a set of time-synchronization messages of the plurality including information about times at the first device according to the first clock that time-synchronization messages of a set were sent and received by the first device; determining, for a set of the plurality and based, at least in part, on the information of the set, a message-transmission duration of the time-synchronization messages transceived; determining, over the plurality, a moving average of message-transmission durations based on the sets of the plurality; and setting the second clock of the second device to a combination of a time at the first device and the moving average.

B: The system of paragraph A, wherein the operations further comprise measuring a second-device receipt time of the second clock associated with the second device receiving an initial time-synchronization message and a second-device send time of the second clock associated with the second device transmitting an acknowledgment time-synchronization message, wherein the determining of the message-transmission duration is further based at least in part on the second-device receipt time and the second-device send time.

C: The system of paragraph A or B, wherein the transceiving of the plurality includes transceiving a set of the plurality, the transceiving of the set includes: sending, by the first device and at a first-device send time according to the first clock, an initial time-synchronization message to the second device, the initial time-synchronization message comprising first timing data including the first-device send time; receiving, by the second device and at a second-device receipt time according to the second clock, the initial time-synchronization message; sending, by the second device and at a second-device send time according to the second clock, an acknowledgment time-synchronization message to the first device; receiving, by the first device at a first-device receipt time according to the first clock, the acknowledgment time-synchronization message; sending, by the first device, a responsive time-synchronization message to the second device, the responsive time-synchronization message comprising second timing data including the first-device receipt time; and receiving, by the second device, the responsive time-synchronization message from the first device.

D: The system of paragraph C, wherein the determining of the message-transmission duration comprises determining an average message-transmission duration based, at least in part, upon the first-device send time, the second-device receipt time, the second-device send time, and the first-device receipt time.

E: The system of any of paragraphs A-D, wherein the operations further comprise: determining, using a sensor of the second device, a measurement of a condition observable by the sensor at a measurement time according to the second clock; generating a timestamp based on the measurement time; and sending, to a computing system via the communication network, the measurement and the timestamp.

F: The system of any of paragraphs A-E further comprising setting a resettable sync clock of the second device to a combination of a time at the first device and the moving average.

G: A method comprising: receiving, by a second device and at a second-device receipt time according to a second clock, an initial time-synchronization message that was sent by a first device and comprising a first-device send time according to a first clock; sending, by the second device an acknowledgment time-synchronization message to the first device comprising a second-device send time according to the second clock; receiving, by the second device, a responsive time-synchronization message from the first device, the responsive time-synchronization message comprising second timing data including a first-device receipt time according to the first clock that the first device received the acknowledgment time-synchronization message from the second device; and determining a time delay data, wherein the time delay data is associated with a transmission duration of the initial time-synchronization message and the acknowledgment time-synchronization message.

H: The method of paragraph G, further comprising: repeatedly receiving additional initial time-synchronization messages, sending of additional acknowledgment time-synchronization messages, receiving of additional responsive time-synchronization messages, and determining additional time delay data as additional sets of a plurality of sets of associated initial time-synchronization message, acknowledgment time-synchronization message, and responsive time-synchronization message; and determining, based at least in part on a portion of the plurality, a smoothing of the time delay data of the sets of the plurality.

I: The method of paragraph H, further comprising setting a resettable sync clock of the second device to a combination of a first-device send time of the initial time-synchronization message of set of the plurality and the smoothing of the time delay data of the sets of the plurality.

J: The method of paragraph I, further comprising: determining, using a sensor of the second device, a measurement of a condition observable by the sensor at a measurement time according to the resettable sync clock; generating a timestamp based on the measurement time; and sending, to a computing system via a communication network, the measurement and the timestamp.

K: The method of paragraph H or I, wherein the determining the smoothing includes performing a moving average of the time delay data of the sets of the plurality.

L: The method of any of paragraphs H-K, wherein the determining the smoothing includes performing a smoothing function that is selected from a group consisting of additive smoothing, butterworth filtering, Chebyshev filtering, digital filtering, elliptic filtering, exponential smoothing, Kalman filtering, kernel smoothing, Kolmogorov-Zurbenko filtering, Laplacian smoothing, local regressing, low-pass filtering, moving averaging, Ramer-Doublas-Peucker downsampling, Savitzky-Golay smooth filtering, smooth splining, and stretched grid approximating.

M: The method of any of paragraphs G-L, wherein the determining of the time delay data is based, at least in part, on the second-device receipt time and the second-device send time.

N: One or more non-transitory computer-readable media storing instructions executable by one or more processors, wherein the instructions, when executed, cause the one or more processors to perform operations comprising: receiving, by a second device and at a second-device receipt time according to a second clock, an initial time-synchronization message that was sent by a first device and comprising a first-device send time according to a first clock; sending, by the second device an acknowledgment time-synchronization message to the first device comprising a second-device send time according to the second clock; receiving, by the second device, a responsive time-synchronization message from the first device, the responsive time-synchronization message comprising second timing data including a first-device receipt time according to the first clock that the first device received the acknowledgment time-synchronization message from the second device; and determining a time delay data, wherein the time delay data is associated with a transmission duration of the initial time-synchronization message and the acknowledgment time-synchronization message.

O: The one or more non-transitory computer-readable media of paragraph N, wherein the operations further comprise: repeatedly receiving additional initial time-synchronization messages, sending of additional acknowledgment time-synchronization messages, receiving of additional responsive time-synchronization messages, and determining additional time delay data as additional sets of a plurality of sets of associated initial time-synchronization message, acknowledgment time-synchronization message, and responsive time-synchronization message; and determining, based at least in part on a portion of the plurality, a smoothing of the time delay data of the sets of the plurality.

P: The one or more non-transitory computer-readable media of paragraph O, wherein the operations further comprise setting a resettable sync clock of the second device to a combination of a first-device send time of the initial time-synchronization message of set of the plurality and the smoothing of the time delay data of the sets of the plurality.

Q: The one or more non-transitory computer-readable media of paragraph P, wherein the operations further comprise: determining, using a sensor of the second device, a measurement of a condition observable by the sensor at a measurement time according to the resettable sync clock; generating a timestamp based on the measurement time; and sending, to a computing system via a communication network, the measurement and the timestamp.

R: The one or more non-transitory computer-readable media of any of paragraphs O-Q, wherein the determining the smoothing includes performing a moving average of the time delay data of the sets of the plurality.

S: The one or more non-transitory computer-readable media of any of paragraphs O-R, wherein the determining the smoothing includes performing a smoothing function that is selected from a group consisting of additive smoothing, butterworth filtering, Chebyshev filtering, digital filtering, elliptic filtering, exponential smoothing, Kalman filtering, kernel smoothing, Kolmogorov-Zurbenko filtering, Laplacian smoothing, local regressing, low-pass filtering, moving averaging, Ramer-Doublas-Peucker downsampling, Savitzky-Golay smooth filtering, smooth splining, and stretched grid approximating.

T: The one or more non-transitory computer-readable media of any of paragraphs N-S, wherein the first device is a computing device and the second device is a sensor device.

U: A system comprising: a first device comprising a first clock representing a primary source of time; a second device comprising a second clock; one or more processors; and one or more non-transitory computer-readable media storing computer-executable instructions that, when executed, cause the system to perform operations comprising: sending, by the first device and at a first time, a first time synchronization message to the second device; receiving, by the second device and at a second time after the first time, the first time synchronization message; sending, by the second device and at a third time after the second time, a second time synchronization message to the first device, the second time synchronization message comprising timing data including the second time and the third time; receiving, by the first device at a fourth time after the third time, the second time synchronization message; and determining, by the first device and based on the first time, the second time, the third time, and the fourth time, time delay data, wherein the time delay data is associated with an average based on a first difference between the second time and the first time and a second difference between the fourth time and the third time.

While the example clauses described above are described with respect to one particular implementation, it should be understood that, in the context of this document, the content of the example clauses may also be implemented via a method, device, system, computer-readable medium, and/or another implementation. Additionally, any of examples A-U may be implemented alone or in combination with any other one or more of the examples A-U.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, components, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   a first device having a first clock;
   a second device having a second clock;
   one or more processors; and
   one or more non-transitory computer-readable media storing computer-executable instructions that, when executed, cause the system to perform operations comprising:
   transceiving, via a communication network between the first device and second device, a plurality of sets of time-synchronization messages, a set of time-synchronization messages of the plurality including information about times at the first device according to the first clock that time-synchronization messages of a set were sent and received by the first device;
   determining, for a set of the plurality and based, at least in part, on the information of the set, a message-transmission duration of the time-synchronization messages transceived;
   determining, over the plurality, a moving average of message-transmission durations based on the sets of the plurality;
   setting the second clock of the second device to a combination of a time at the first device and the moving average;
   determining, using a sensor of the second device, a measurement of a condition observable by the sensor at a measurement time according to the second clock;
   generating a timestamp based on the measurement time; and
   sending, to a computing system via the communication network, the measurement and the timestamp.

2. The system of claim 1, wherein the operations further comprise measuring a second-device receipt time of the second clock associated with the second device receiving an initial time-synchronization message and a second-device send time of the second clock associated with the second device transmitting an acknowledgment time-synchronization message,
   wherein the determining of the message-transmission duration is further based at least in part on the second-device receipt time and the second-device send time.

3. The system of claim 1, wherein the transceiving of the plurality includes transceiving a set of the plurality, the transceiving of the set includes:
   sending, by the first device and at a first-device send time according to the first clock, an initial time-synchronization message to the second device, the initial time-synchronization message comprising first timing data including the first-device send time;
   receiving, by the second device and at a second-device receipt time according to the second clock, the initial time-synchronization message;
   sending, by the second device and at a second-device send time according to the second clock, an acknowledgment time-synchronization message to the first device;
   receiving, by the first device at a first-device receipt time according to the first clock, the acknowledgment time-synchronization message;
   sending, by the first device, a responsive time-synchronization message to the second device, the responsive time-synchronization message comprising second timing data including the first-device receipt time; and
   receiving, by the second device, the responsive time-synchronization message from the first device.

4. The system of claim 3, wherein the determining of the message-transmission duration comprises determining an average message-transmission duration based, at least in part, upon the first-device send time, the second-device receipt time, the second-device send time, and the first-device receipt time.

5. The system of claim 1 further comprising setting a resettable sync clock of the second device to a combination of a time at the first device and the moving average.

6. A method comprising:
   receiving, by a second device and at a second-device receipt time according to a second clock, an initial time-synchronization message that was sent by a first device and comprising a first-device send time according to a first clock;
   sending, by the second device an acknowledgment time-synchronization message to the first device comprising a second-device send time according to the second clock;
   receiving, by the second device, a responsive time-synchronization message from the first device, the responsive time-synchronization message comprising second timing data including a first-device receipt time according to the first clock that the first device received the acknowledgment time-synchronization message from the second device; and
   determining a time delay data, wherein the time delay data is associated with a transmission duration of the initial time-synchronization message and the acknowledgment time-synchronization message.

7. The method of claim 6, wherein the determining of the time delay data is based, at least in part, on the second-device receipt time and the second-device send time.

8. The method of claim 6, further comprising:
   repeatedly receiving additional initial time-synchronization messages, sending of additional acknowledgment time-synchronization messages, receiving of additional responsive time-synchronization messages, and determining additional time delay data as additional sets of a plurality of sets of associated initial time-synchronization message, acknowledgment time-synchronization message, and responsive time-synchronization message; and determining, based at least in part on a portion of the plurality, a smoothing of the time delay data of the sets of the plurality.

9. The method of claim 8, further comprising setting a resettable sync clock of the second device to a combination of a first-device send time of the initial time-synchronization message of set of the plurality and the smoothing of the time delay data of the sets of the plurality.

10. The method of claim 9, further comprising:
determining, using a sensor of the second device, a measurement of a condition observable by the sensor at a measurement time according to the resettable sync clock;
generating a timestamp based on the measurement time; and
sending, to a computing system via a communication network, the measurement and the timestamp.

11. The method of claim 8, wherein the determining the smoothing includes performing a moving average of the time delay data of the sets of the plurality.

12. The method of claim 8, wherein the determining the smoothing includes performing a smoothing function that is selected from a group consisting of additive smoothing, butterworth filtering, Chebyshev filtering, digital filtering, elliptic filtering, exponential smoothing, Kalman filtering, kernel smoothing, Kolmogorov-Zurbenko filtering, Laplacian smoothing, local regressing, low-pass filtering, moving averaging, Ramer-Doublas-Peucker downsampling, Savitzky-Golay smooth filtering, smooth splining, and stretched grid approximating.

13. One or more non-transitory computer-readable media storing instructions executable by one or more processors, wherein the instructions, when executed, cause the one or more processors to perform operations comprising:
receiving, by a second device and at a second-device receipt time according to a second clock, an initial time-synchronization message that was sent by a first device and comprising a first-device send time according to a first clock;
sending, by the second device an acknowledgment time-synchronization message to the first device comprising a second-device send time according to the second clock;
receiving, by the second device, a responsive time-synchronization message from the first device, the responsive time-synchronization message comprising second timing data including a first-device receipt time according to the first clock that the first device received the acknowledgment time-synchronization message from the second device; and
determining a time delay data, wherein the time delay data is associated with a transmission duration of the initial time-synchronization message and the acknowledgment time-synchronization message.

14. The one or more non-transitory computer-readable media of claim 13, wherein the first device is a computing device and the second device is a sensor device.

15. The one or more non-transitory computer-readable media of claim 13, wherein the operations further comprise:
repeatedly receiving additional initial time-synchronization messages, sending of additional acknowledgment time-synchronization messages, receiving of additional responsive time-synchronization messages, and determining additional time delay data as additional sets of a plurality of sets of associated initial time-synchronization message, acknowledgment time-synchronization message, and responsive time-synchronization message; and
determining, based at least in part on a portion of the plurality, a smoothing of the time delay data of the sets of the plurality.

16. The one or more non-transitory computer-readable media of claim 15, wherein the operations further comprise setting a resettable sync clock of the second device to a combination of a first-device send time of the initial time-synchronization message of set of the plurality and the smoothing of the time delay data of the sets of the plurality.

17. The one or more non-transitory computer-readable media of claim 16, wherein the operations further comprise:
determining, using a sensor of the second device, a measurement of a condition observable by the sensor at a measurement time according to the resettable sync clock;
generating a timestamp based on the measurement time; and
sending, to a computing system via a communication network, the measurement and the timestamp.

18. The one or more non-transitory computer-readable media of claim 15, wherein the determining the smoothing includes performing a moving average of the time delay data of the sets of the plurality.

19. The one or more non-transitory computer-readable media of claim 15, wherein the determining the smoothing includes performing a smoothing function that is selected from a group consisting of additive smoothing, butterworth filtering, Chebyshev filtering, digital filtering, elliptic filtering, exponential smoothing, Kalman filtering, kernel smoothing, Kolmogorov-Zurbenko filtering, Laplacian smoothing, local regressing, low-pass filtering, moving averaging, Ramer-Doublas-Peucker downsampling, Savitzky-Golay smooth filtering, smooth splining, and stretched grid approximating.

* * * * *